Feb. 23, 1937. L. E. MILLER 2,072,008
ADJUSTABLE SPEED ELECTRIC MOTOR
Filed Feb. 7, 1935 2 Sheets-Sheet 1

INVENTOR.
Lloyd E. Miller
BY Fay, Oberlin & Fay
ATTORNEYS.

INVENTOR.
Lloyd E. Miller
BY
Fay, Oberlin & Fay
ATTORNEYS.

Patented Feb. 23, 1937

2,072,008

UNITED STATES PATENT OFFICE 2,072,008

ADJUSTABLE SPEED ELECTRIC MOTOR

Lloyd E. Miller, Cleveland Heights, Ohio, assignor to The Reliance Electric & Engineering Company, Cleveland, Ohio, a corporation of Ohio Application February 7, 1935, Serial No. 5,436

21 Claims. (Cl. 172—239)

This invention relates to electric motors, and more particularly adjustable speed motors; and is is among the objects of the invention to provide a motor capable of adjustability through speed change in imperceptible progression or without sharp change from rate to rate. Another object is the provision of an adjustable speed motor capable of repeating its speed-change cycle over and over again with identical performance. Another object is the provision of a construction making possible the setting or control of a cycle of speed change so as to obtain more or less of a repetitive cycle as desired. Other objects and advantages will appear as the description proceeds.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

In said annexed drawings:—

Figure 1:
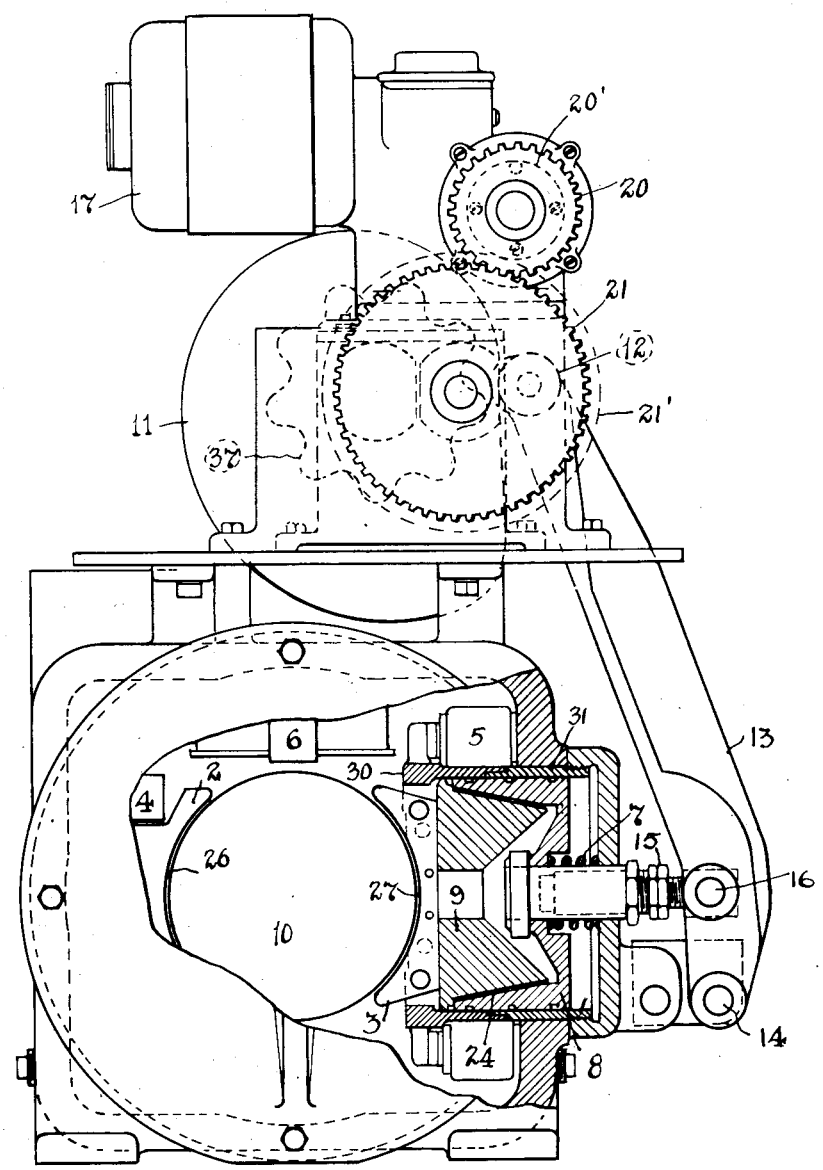
Figure 2:
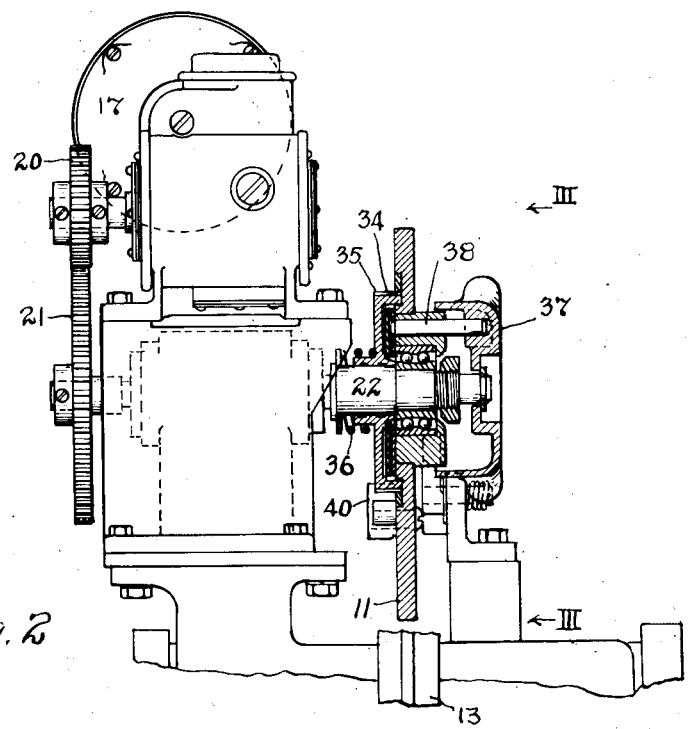
Figure 4:
Figure 3:
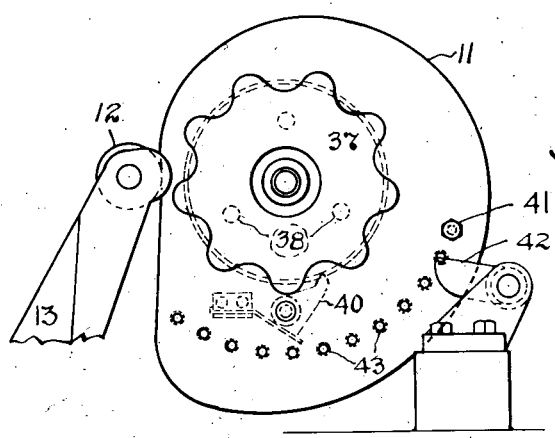

Fig. 1 is a side elevational view of a motor in accordance with the invention, parts being broken away for clarity; Fig. 2 is a detail elevation of the upper portion of the structure, taken at right angles to Fig. 1, a portion of the view being in vertical section; Fig. 3 is a further detail elevational view looking in the direction of the arrows III in Fig. 2; and Fig. 4 is a wiring diagram.

Referring more particularly to the drawings, there is shown a motor with pole pieces 2, 3, and windings 4, 5, thereon, also desirably inter-poles 6, etc., the precise detail as to these being capable of variation in accordance with accustomed practice. The pole 2 is fixed, but the other pole includes movable construction, the pole element 8 being reciprocably movable with respect to the pole shoe 3 and its connected pole portion 9, the change of position of the movable pole portion 8 occasioning a change in reluctance of the magnetic circuit and correspondingly changing the speed of rotation of the motor armature 10. For operating the movable pole portion 8, an actuator is provided, in the form of a member 11 having a periphery coacting with a roller 12 on a lever 13 which is pivoted to the motor frame at 14, a link 15 connecting the movable pole element 8 and the lever 13 at a point of connection 16. The actuator 11 is rotated by suitable timing means, as clock-work or electric timing means, and which may comprise for instance a small synchronous motor mechanism 17 driving through gearing of usual or preferred type, and including pinions 20, 21, and thence into connecting gears to the shaft 22 on which the actuator 11 is carried. By change of the gear ratio at this point, as by substitution of other pinions 20', 21' of desired ratio, the rate of drive of the actuator 11 may be changed in general also.

From the structure so far described, it will be seen that as the actuator 11 turns, it varies the position of the movable pole element 8 correspondingly. By shaping the cooperating pole elements 8, 9, with a tapered contour 24, the effective rate of change with displacement is increased, the taper providing a gap having a much greater area than would otherwise be the case, and a larger area of gap occasions a lower reluctance, and hence fewer ampere turns are required in proportion to a change in amount of the gap. Furthermore, since the tapered sides of the gap do not separate from each other as rapidly as the movable pole element 8 is withdrawn, a greater travel thereof is required to cause a definite change of speed than would be the case if the surface were plane. A corresponding accuracy in the speed rate of the armature is accordingly had. Since the reluctance of the magnetic circuit is disturbed by the movement of the pole element 8, it is desirable that the gaps at the pole faces 26, 27, be unequal, gap 26 being greater than gap 27, so that inequality in reluctance is more nearly compensated during average position of the movable pole element. With proper commutation characteristics in the motor, undue sparking caused by distortion of the magnetic flux on the shifting of the movable pole element, is avoided. Since the exact load which may be imposed upon the motor by the machinery which it may operate cannot be definitely predetermined and may vary through the timing cycle or from one timing cycle to another, it is desirable that the motor have a flat load speed characteristic or may not vary to any great extent from full load condition to no load condition. For this, desirably the field has a differential series winding d, Fig. 4, thus tending to weaken the flux when the load is high, and strengthen the flux when the load is low. Such auxiliary change in the flux tends to correct the natural speed drop of the motor, and give a flat speed load characteristic.

The pole elements 8, 9, may be surrounded by a tubular sleeve, and desirably this may be in two parts, an inner section 30, of non-magnetic metal, as brass, etc., and an outer section 31, of magnetic metal. By provision of the non-magnetic section, sneak-paths are obviated, and the proper direction is given the flux through the frame and movable pole element.

The operation of the motor will be readily understood from the foregoing. The position of the movable pole element 8 is continuously changed by the pole actuator 11 through the roller 12 and lever 13, and with continuous operation as controlled by the timer 17, the cycle of speed change tends to repeat itself. With some classes of work it is desirable to be able to re-set the actuator at any time, and to any desired point in its designed cycle. For this, a slip connection may be arranged between the timer and the actuator 11. For instance, the actuator 11 may have internal gear teeth 34, meshable with a slide gear 35 splinedly mounted on shaft 22, and normally urged into engagement with the actuator, by a thrust-spring 36. A push-out handle 37 having pins 38 is carried by the actuator 11, and is always available for manual operation by the machine supervisor pushing on the hand wheel 37, forcing the slide gear 35 back out of mesh with the teeth 34 of the actuator, thereby freeing the latter from the timer drive, and allowing it to be swung around by hand to any desired point of engagement with the lever-roller 12, and providing a corresponding positioning of the movable pole element 8. A pawl 40 operating upon the teeth of the slide gear 35 allows turning of the actuator 11 in suitable direction for such re-setting. To facilitate accurate return to the same desired point of re-set in sequential operations, the actuator 11 may also be provided with a stop-pin or projection 41, which on being swung around into contact with the dog 42 on the frame work determines a point of stoppage in the manual setting of the actuator. The dog 42 may be swingably mounted, so as to be capable of being turned out of the path of the stop-pin if desired. Preferably, the stop projection 41 may be in the form of a pin screw-threaded into the actuator 11, and by provision of a series of tapped holes 43, the pin may be set in any one thereof as desired, in accordance with the work-control in view.

Fine adjustment of the length of link 15 between the lever 13 and the movable pole element 8 may be had by suitable screw-threaded bushing take-up construction, and a spring 7 effective on the movable pole element insures inward movement thereof without entirely depending upon the magnetic pull.

Other modes of applying the principle of the invention may be employed, change being made as regards the details described, provided the features stated in any of the following claims, or the equivalent of such, be employed.

I therefore particularly point out and distinctly claim as my invention:

1. In an electric motor, a bucking series field winding, and means for varying the speed without step-wise stages, including a reciprocable pole element, and means for operating said pole element in definite cycle.

2. In an electric motor, means for varying the speed, including a reciprocable pole element, a spring urging said pole in one direction, and means for urging said pole element in an opposite direction in definite cycle.

3. In an electric motor, means for varying the speed without step-wise stages, including a fixed pole and another pole shoe at different distances from the armature, a reciprocable pole element for movement relative to said last pole shoe, and means for moving said reciprocable pole element in definite cycle.

4. In an electric motor, means for varying the speed without step-wise stages, including a reciprocable pole element, an actuator for operating said pole element in definite cycle, and adjustable re-setting means for setting said actuator for a desired cycle.

5. In an electric motor, means for varying the speed, including a reciprocable pole element, an actuator for operating said pole element through a controlled cycle, and a release-clutch for the resetting of the actuator for a desired cycle.

6. In an electric motor, means for varying the speed, including a reciprocable pole element, an actuator for operating said pole element through a controlled cycle, and adjustable stop-means for determining the re-set of the actuator for a desired cycle.

7. In an electric motor, means for varying the speed without step-wise stages, including a reciprocable pole element, an actuator for operating said pole element, adjustable gears for driving said actuator, and time-controlled means for operating said gears.

8. In an electric motor, means for varying the speed, including a reciprocable pole element, an actuator for operating said pole element through a controlled cycle, a release-clutch for the resetting of the actuator for a desired cycle, and a ratchet allowing one-way free turning of said actuator.

9. In an electric motor, means for varying the speed, including a reciprocable pole element, and a rotary element contoured in a progressive curve for moving said pole element in a definite cycle.

10. In an electric motor, means for varying the speed, including a reciprocable pole element, a rotary element contoured in a progressive curve for moving said pole element in a definite cycle, and a releasable connection mounting said rotary element whereby it may be re-oriented for movement of said pole element.

11. In an electric motor, means for varying the speed, including a reciprocable pole element, a rotary element contoured in a progressive curve for moving said pole element in a definite cycle, and a stop operable upon said rotary element.

12. In an electric motor, means for varying the speed, including a reciprocable pole element, a rotary element contoured in a progressive curve for moving said pole element in a definite cycle, and a settable stop operable upon said rotary element.

13. In an electric motor, means for varying the speed, including a reciprocable pole element, a rotary element contoured in a progressive curve for moving said pole element in a definite cycle, a pin in said rotary element, and a dog in the path of said pin.

14. In an electric motor, means for varying the speed, including a reciprocable pole element, a rotary element contoured in a progressive curve for moving said pole element in a definite cycle, a pin positionable at a selected location in said rotary element to stop the same, and a fixed abutment arranged in the path of said pin for its stoppage.

15. In an electric motor, means for varying the speed, including a reciprocable pole element, a rotary element contoured in a progressive curve for moving said pole element in a definite cycle, a pin positionable at a selected location in said rotary element, and a dog capable of being turned into position in the path of said pin.

16. In an electric motor, means for varying the speed, including a reciprocable pole element, a rotary element contoured in a progressive curve for moving said pole element in a definite cycle, a releasable connection mounting said rotary element whereby it may be re-oriented for movement of said pole element, and a stop operable upon said rotary element.

17. In an electric motor, means for varying the speed, including a reciprocable pole element, a rotary element contoured in a progressive curve for moving said pole element in a definite cycle, a releasable connection mounting said rotary element whereby it may be re-oriented for movement of said pole element, and a settable stop operable upon said rotary element.

18. In an electric motor, means for varying the speed, including a reciprocable pole element, a rotary element contoured in a progressive curve for moving said pole element in a definite cycle, a releasable connection mounting said rotary element whereby it may be re-oriented for movement of said pole element, a pin in said rotary element, and a dog in the path of said pin.

19. In an electric motor, means for varying the speed, including a reciprocable pole element, a rotary element contoured in a progressive curve for moving said pole element in a definite cycle, a releasable connection mounting said rotary element whereby it may be re-oriented for movement of said pole element, a pin positionable at a selected location in said rotary element, and a dog in the path of said pin.

20. In an electric motor, means for smoothly varying the speed without step-wise changes, including a reciprocable pole element, an actuator for operating said pole element, and time-controlled means for optionally operating said actuator.

21. In an electric motor, means for smoothly varying the speed without step-wise changes, including a reciprocable pole element in a surrounding sleeve in part of non-magnetic metal, an actuator for operating said reciprocable pole element, and time-controlled means for optionally operating said actuator.

LLOYD E. MILLER.